(12) United States Patent
Watanabe (10) Patent No.: US 10,624,021 B2
(45) Date of Patent: Apr. 14, 2020

(54) COMMUNICATION SYSTEM, BASE STATION DEVICE, CONTROL DEVICE, AND COMMUNICATION METHOD

(71) Applicant: NEC Corporation, Minato-ku, Tokyo (JP)

(72) Inventor: Yoshinori Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 143 days.

(21) Appl. No.: 15/747,484

(22) PCT Filed: Aug. 17, 2016

(86) PCT No.: PCT/JP2016/003756
§ 371 (c)(1),
(2) Date: Jan. 25, 2018

(87) PCT Pub. No.: WO2017/029811
PCT Pub. Date: Feb. 23, 2017

(65) Prior Publication Data
US 2018/0220359 A1    Aug. 2, 2018

(30) Foreign Application Priority Data
Aug. 20, 2015    (JP) .................................. 2015-162350

(51) Int. Cl.
*H04W 48/06*    (2009.01)
*H04L 12/66*    (2006.01)
(Continued)

(52) U.S. Cl.
CPC .............. *H04W 48/06* (2013.01); *H04L 12/66* (2013.01); *H04L 63/1416* (2013.01);
(Continued)

(58) Field of Classification Search
CPC ......... H04L 67/10; H04L 43/08; H04L 67/12; H04W 88/16; H04W 76/10
See application file for complete search history.

(56) References Cited

U.S. PATENT DOCUMENTS

2013/0150985 A1    6/2013    Ohkado et al.
2014/0295823 A1    10/2014   Someya et al.
(Continued)

FOREIGN PATENT DOCUMENTS

EP    2773150 A1    9/2014
JP    2012-168755 A    9/2012
(Continued)

OTHER PUBLICATIONS

Mobile-Edge Computing-Introductory Technical White Paper, Sep. 2014, Issue 1, 36 pages.
(Continued)

*Primary Examiner* — Jung H Park (57) ABSTRACT

In order to enable the protection of a system in which an abnormality is detected even while restricting the degradation of availability of a service provided by a base station device, a communication system in an exemplary embodiment has a first server which provides a first service, a second server which provides a second service, and a first base station device communicating with the first and second servers, wherein in the case where the second service has a higher priority than the first service, a communication path between the first base station device and the first server is cut off when an abnormality is detected from the first server.

6 Claims, 8 Drawing Sheets

(51) Int. Cl.
| | |
|---|---|
| *H04W 24/04* | (2009.01) |
| *H04W 12/12* | (2009.01) |
| *H04L 29/06* | (2006.01) |
| *H04W 28/08* | (2009.01) |
| *H04W 28/02* | (2009.01) |
| *H04W 48/02* | (2009.01) |
| *H04W 36/00* | (2009.01) |

(52) U.S. Cl.
CPC ..... *H04L 63/1425* (2013.01); *H04W 12/1202* (2019.01); *H04W 24/04* (2013.01); *H04W 28/0268* (2013.01); *H04W 28/08* (2013.01); *H04W 36/0005* (2013.01); *H04W 48/02* (2013.01)

(56) References Cited

U.S. PATENT DOCUMENTS

2016/0270133 A1 9/2016 Ogura
2016/0295461 A1* 10/2016 Chiu ............... H04W 36/00837
2018/0159765 A1* 6/2018 Shi ........................ H04W 40/02
2018/0295098 A1* 10/2018 Yuzawa ................. H04L 12/66

FOREIGN PATENT DOCUMENTS

| JP | 2013-258648 A | 12/2013 |
|---|---|---|
| WO | 2015/072129 A1 | 5/2015 |

OTHER PUBLICATIONS

The 3rd Generation Partnership Project (3GPP), "Support new services such as: local server support", 3GPP TSG-SA WG1 Meeting #71, Aug. 17-21, 2015, S1-152096, Belgrade, Serbia, 3 pages.
International Search Report for PCT Application No. PCT/JP2016/003756, dated Oct. 25, 2016.
English translation of Written opinion for PCT Application No. PCT/JP2016/003756.
Extended European Search Report for EP Application No. EP16836804.1 dated Feb. 18, 2019.

* cited by examiner

COMMUNICATION SYSTEM, BASE STATION DEVICE, CONTROL DEVICE, AND COMMUNICATION METHOD

This application is a National Stage Entry of PCT/JP2016/003756 filed on Aug. 17, 2016, which claims priority from Japanese Patent Application 2015-162350 filed on Aug. 20, 2015, the contents of all of which are incorporated herein by reference, in their entirety.

TECHNICAL FIELD

The present invention relates to a communication system, a base station device, a control device, and a communication method in a radio communication network.

BACKGROUND ART

In recent years, communication services have been more diversified, as the network has started to be used in more applications. This trend has caused various changes in the network environment.

First, provision of services such as traffic control and remote medicine that require high reliability, i.e., mission critical service (MCS), has been considered.

Secondly, devices to be connected to a base station have been more and more diversified. Specifically, in addition to general mobile terminals, such devices as monitoring cameras may be connected to a base station.

Thirdly, application of a system that incorporates therein mobile edge computing (MEC) has been considered. Non Patent Literature 1 describes a communication system that incorporates therein a technology of MEC. Incorporation of a technology of MEC makes it possible to provide services that require real-time processing and analysis of vast data, while restraining the burden on core networks. Consequently, services are expected to be provided with lower latency and broader bandwidth than ever before.

On the other hand, in accordance with such changes in network environments, various methods to detect system abnormalities due to unauthorized accesses or the like have started to be considered. In particular, as devices to be connected to a base station device have been diversified, poorly secured devices may be connected to base station devices. In view of this, there is a heightened demand for protecting a system from unauthorized accesses.

For example, Patent Literature 1 describes a technology of protecting a system from abnormalities due to an unauthorized access or the like. Patent Literature 1 describes an abnormality detection system that detects an abnormality occurring in a control system, and isolates the control system found to be abnormal.

CITATION LIST

Patent Literature

[PTL 1] Japanese Patent Application Publication No. 2012-168755

Non Patent Literature

[NPL 1] Mobile-Edge Computing-Introductory Technical White Paper September 2014

SUMMARY OF INVENTION

Technical Problem

In the future, introduction of a technology of MEC or the like may make a single base station device in a communication system provide a user terminal with a plurality of services differing in priority levels. When an abnormality is detected in such communication system, application of the technology in Patent Literature 1 will stop all the services provided by the base station device included in the communication system. Here, when an MCS is included among the services provided by the base station device, the MCS service also stops. On the other hand, if the abnormality in the communication system is left unattended, the MCS will stop functioning normally, which may result in serious accidents.

In view of the above, one objective which the example embodiments disclosed in the present description attempts to achieve is to provide a communication system, a base station device, a control device, and a communication method, which can protect the communication system detected to be abnormal, while restraining the deterioration in availability of services provided by the base station device.

Solution to Problem

A communication system of the present embodiment includes: a first server that provides a first service; a second server that provides a second service; and a first base station device that communicates with the first server and the second server, wherein when the second service has a higher priority level than the first service, and when an abnormality is detected in the first server, a communication path between the first base station device and the first server is blocked.

A base station device of the present embodiment in a communication system includes: a means that communicates with a first server that provides a first service; a means that communicates with a second server that provides a second service; and a means that stops communication with the first server, when an abnormality is detected in the first server when the second service has a higher priority level than the first service.

A control device of the present embodiment is a control device in a communication system, wherein the communication system includes: a first server that provides a first service; a second server that provides a second service; and a first base station device that communicates with the first server and the second server, and when the second service has a higher priority level than the first service, and when an abnormality is detected in the first server, the control device controls whereby a communication path between the first base station device and the first server is blocked.

A communication method of the present embodiment is a communication method in a communication system, wherein the communication system includes: a first server that provides a first service; a second server that provides a second service; and a first base station device that communicates with the first server and the second server, the communication method comprising: blocking a communication path between the first base station device and the first server, when an abnormality is detected in the first server in cases where the second service has a higher priority level than the first service.

Advantageous Effects of Invention

The above-described example embodiments can protect the communication system detected to be abnormal, while restraining the deterioration in availability of services provided by the base station device.

DESCRIPTION OF EMBODIMENTS

The following describes specific example embodiments with reference to the drawings, in detail. The same or corresponding elements in each drawing are assigned the same reference numerals. For clarification purposes, overlapping explanation is omitted where necessary.

The plurality of example embodiments described below can be implemented independently or in appropriate combination. These plurality of example embodiments have mutually different novel characteristics. Therefore, these plurality of example embodiments contribute to solution of mutually different objectives or problems, and contribute to achievement of mutually different effects.

[First Example Embodiment]

Figure 1:
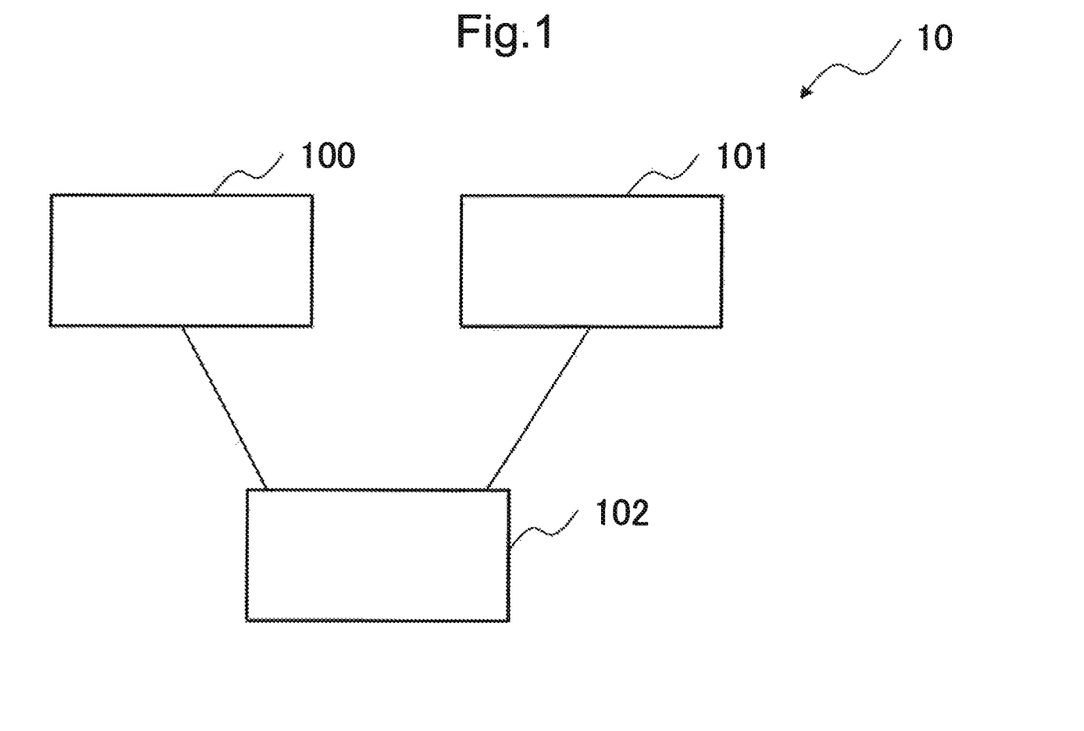
FIG. 1 is a block diagram illustrating a configuration of a communication system according to a first example embodiment.

A configuration of a communication system according to a first example embodiment of the present invention is described below with reference to FIG. 1.

The communication system 10 according to the present example embodiment includes a server 100, a server 101, and a base station device 102. The server 100 provides a first service. The server 101 provides a second service. The base station device 102 communicates with the server 100 and the server 101.

Figure 2:
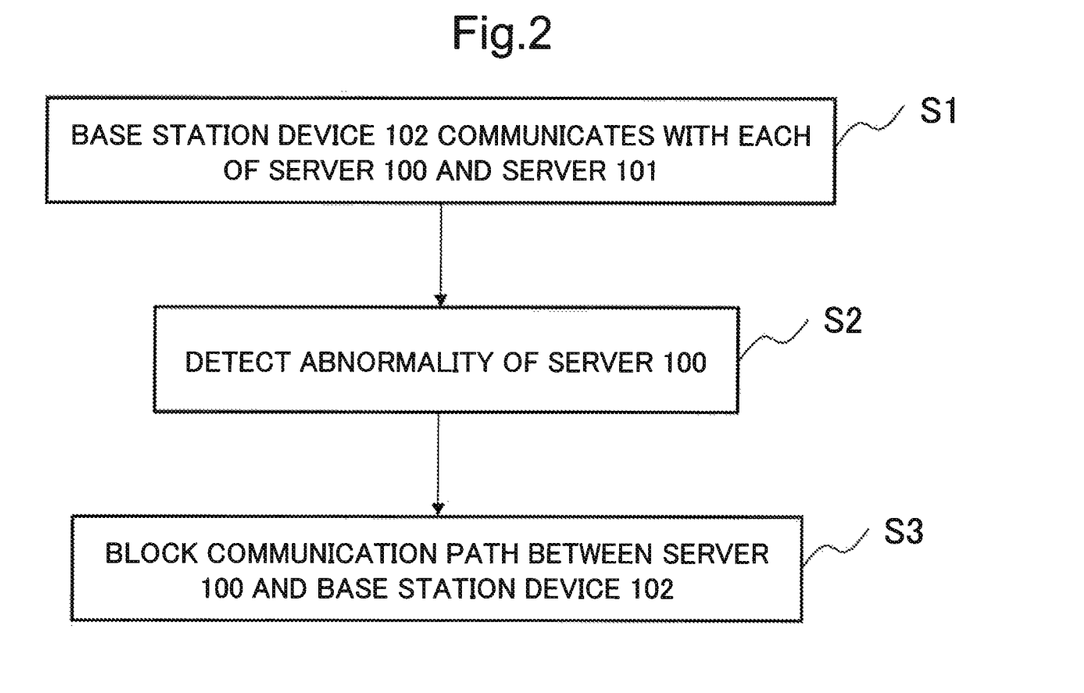
FIG. 2 is a flowchart for explaining an operation of the communication system according to the first example embodiment.

Next, an operation of the communication system 10 according to the present example embodiment is described below with reference to FIG. 2. Note that, in the present example embodiment, it is assumed that the second service provided by the server 101 has a higher priority level than the first service provided by the server 100. The priority level of a service is determined, for example, based on the required level of reliability; however, the priority level of a service may be determined based on different criteria.

The base station device 102 according to the present example embodiment communicates with the server 100 and the server 101 (Step S1). Then, when any abnormality is detected in the server 100 (Step S2), the communication path between the base station device 102 and the server 100 is blocked (Step S3).

By doing so, provision of the first service by the base station device 102 will stop. On the other hand, the communication path between the base station device 102 and the server 101 will not be blocked. Accordingly, provision of the second service by the base station device 102 can continue.

As described above, according to the present example embodiment, when the server 100 that provides the first service is detected to be abnormal, the communication path between the server 100 and the base station device 102 will be blocked. Therefore, while stopping the communication with the server 100, the base station device 102 does not have to stop provision of the second service having a higher priority level than the first service. In this way, in the communication system 10 according to the present example embodiment, the communication system 10 detected to be abnormal can be protected, while the deterioration in availability of services provided by the base station device 102 being restrained.

Note that, the operation in the present example embodiment is described by way of a case in which an abnormality is detected in the server 100 that provides the first service having a lower priority level than the second service. When, on the other hand, an abnormality is detected in the server 101 that provides the second service, a different operation may be performed. That is, when an abnormality is detected in the server 101, the system of the operation and maintenance (O&M) may be notified that an abnormality has been detected, instead of blocking the communication path between the server 101 and the base station device 102.

[Second Example Embodiment]

Figure 3:
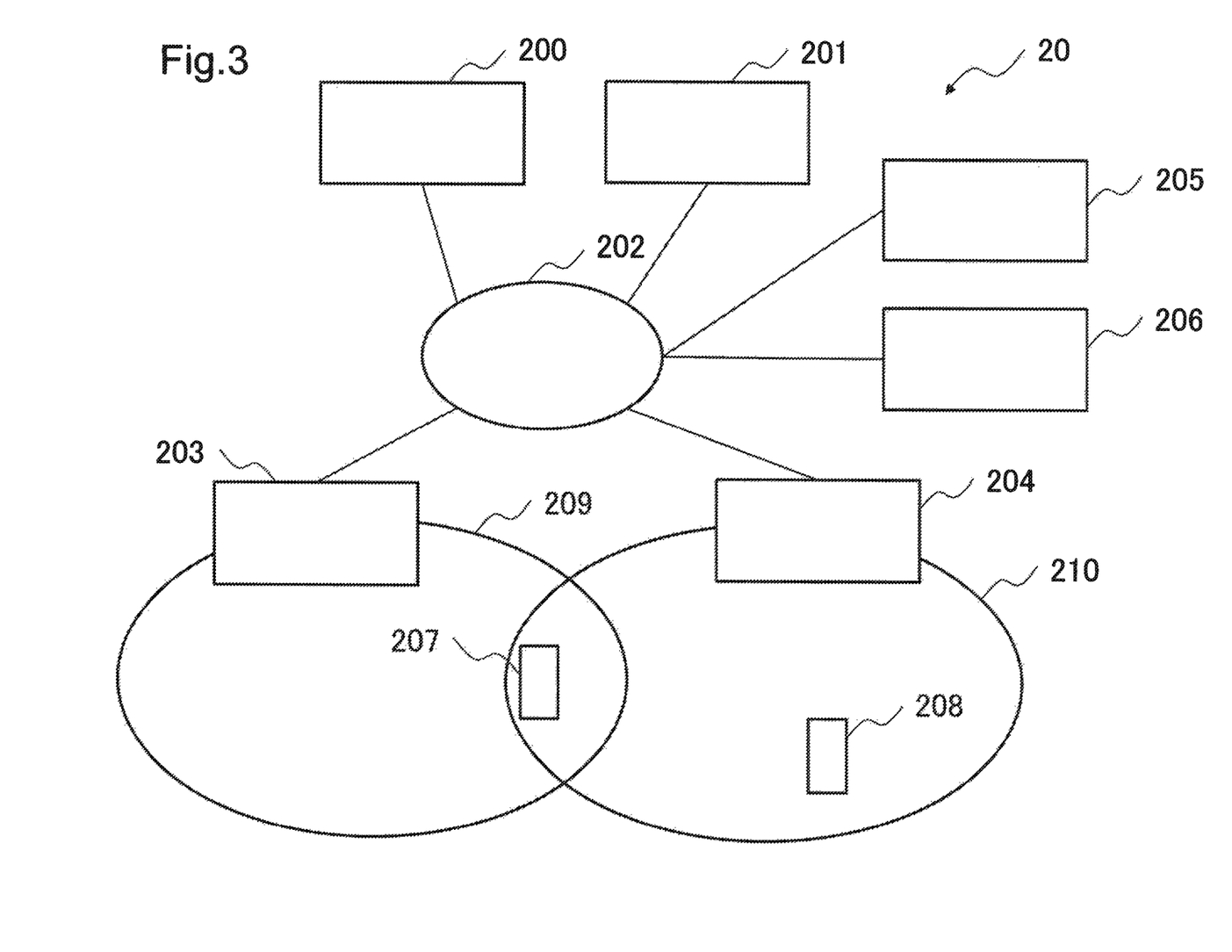
FIG. 3 is a block diagram illustrating a configuration of a communication system according to a second example embodiment.

Next, a second example embodiment of the present invention is described below. FIG. 3 illustrates a configuration of a communication system according to the present example embodiment. The communication system 20 according to the present example embodiment includes an MEC server 200, an MEC server 201, a switch 202, a base station device 203, a base station device 204, a monitoring device 205, a control device 206, a communication terminal 207, and a communication terminal 208.

The MEC server 200 provides a first service. The MEC server 201 provides a second service. The second service has a higher priority level than the first service. In the present example embodiment, the priority level is determined based on the required level of reliability. Specifically, the second service is an MCS that requires a high reliability, for example, remote medicine or traffic control. The first service requires low reliability compared with the MCS, for example, a healthcare service for health care using a passometer or the like.

The switch 202 relays the communication paths among the MEC servers 200, 201, and the base station devices 203, 204, respectively.

Each of the base station devices 203 and 204 can communicate with the MEC servers 200 and 201, and can provide the first service and the second service.

The monitoring device 205 detects an abnormality in the MEC servers 200 and 201. The monitoring device 205 is, for example, an intrusion detection system (IDS) apparatus.

The control device 206 controls the switch 202 and performs handover control over the base station devices 203 and 204. The control device 206 also manages information on the types of servers with which the base station device 203 and the base station device 204 can communicate. The control device 206 is, for example, a self-organizing network (SON) server for use in a SON.

The communication terminal 207 is a terminal that subscribes to the first service. In addition, the communication terminal 207 is located in a position where coverage of cell 209 of the base station device 203 overlaps with coverage of cell 210 of the base station device 204, in the present example embodiment. The communication terminal 208 is a terminal that subscribes to the second service, and is located within a range of the coverage of cell 210 of the base station device 204.

The communication terminals 207 and 208 are devices that communicate with a base station device, and may be a mobile terminal such as a portable telephone and a smartphone, as well as a communication terminal such as a monitoring camera, an environment sensor, and a connected car.

Figure 4:
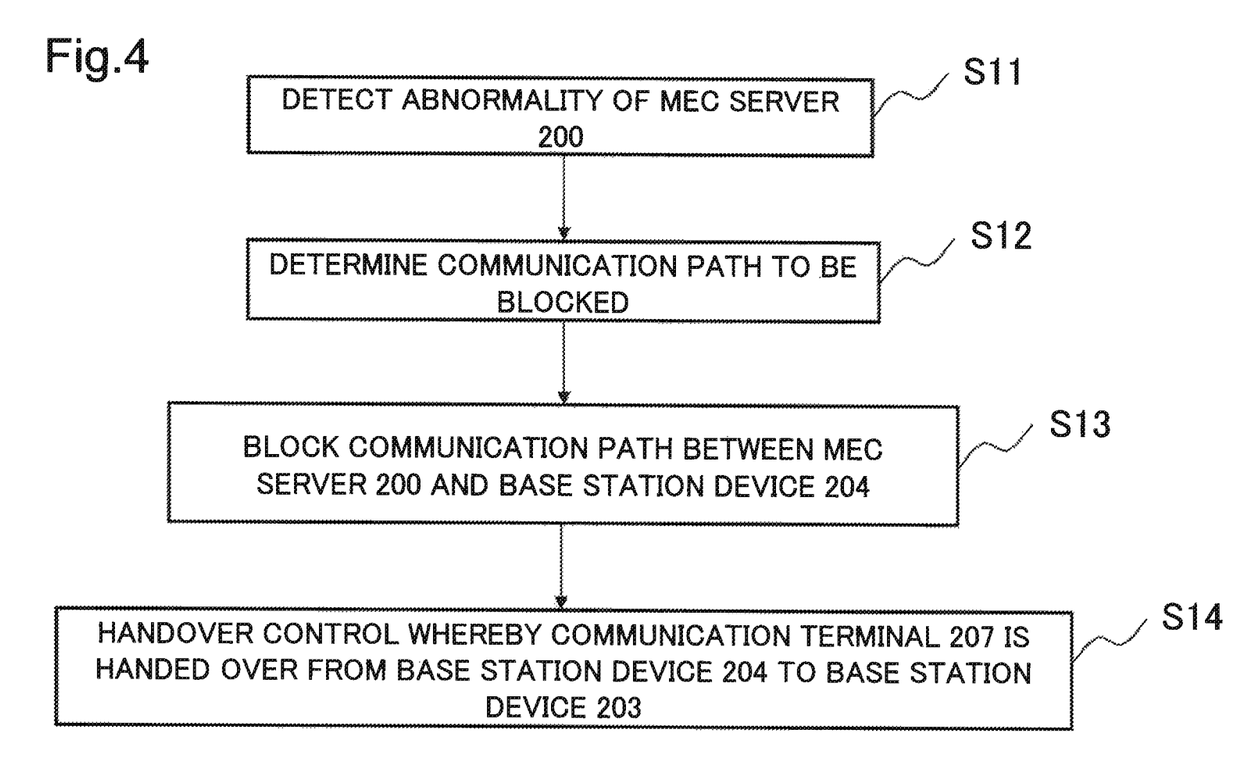
FIG. 4 is a flowchart for explaining an operation of the communication system according to the second example embodiment.

An operation of the communication system 20 according to the present example embodiment is described below with reference to FIG. 4. First of all, the monitoring device 205 detects an abnormality caused in the MEC server 200 (Step S11). Abnormalities of the MEC server 200 may be caused when, for example, the MEC server 200 receives an unauthorized access via the communication terminal 207.

A method of detecting an abnormality by the monitoring device 205 is described in detail below. First, the monitoring device 205 monitors the result of the service provision by the base station devices 203 and 204. The relevant service whose provision result is to be monitored is a service having a high priority level, i.e., the second service being an MCS. Specifically, the monitoring device 205 counts the number of times at which the base station devices 203 and 204 provide the second service to the communication terminal located in its own cell, and manages it as a counted value. Then, it monitors the amount of traffic between the base station device whose counted value is a predetermined value or more and the MEC server to which this base station device is connected. Here, the counted value may be the one within a predetermined period of time. For example, the number of times at which the second service is provided within past one month may be counted.

In the present example embodiment, it is assumed that the number of times at which the second service is provided by the base station device 204 is a predetermined counted value or more. On the other hand, it is assumed that the number of times at which the second service is provided by the base station device 203 is less than the predetermined counted value. This includes a case in which no second service has been provided by the base station device 203. In this case, the monitoring device 205 monitors the amount of traffic among the base station device 204 and the MEC servers 200 and 201 to which this base station device 204 is connected. Then, the monitoring device 205 detects an abnormality in the MEC servers 200 and 201 based on this amount of traffic. For example, the amount of generated traffic may be statistically managed, and a case in which there is traffic in an amount way over a normal amount of traffic may be determined to be abnormal.

When the monitoring device 205 detects an abnormality in the MEC server 200, the control device 206 determines the communication path to be blocked, based on the priority level of the services provided by the base station devices 203 and 204 communicating with the MEC server 200 (Step S12). Specifically, the base station device that is providing a service having a higher priority level than the service provided by the MEC server 200 is extracted, and the communication path between this base station device and the MEC server 200 is determined to be blocked. In the present example embodiment, the second service has a higher priority level than the first service. In addition, the number of times at which the second service is provided by the base station device 204 is a predetermined counted value or more. On the other hand, the number of times at which the second service is provided by the base station device 203 is less than the predetermined counted value. Therefore, the control device 206 determines to block the communication path between the base station device 204 and the MEC server 200.

Then, the control device 206 controls the switch 202 whereby the switch 202 blocks the communication path between the MEC server 200 and the base station device 204. Then, the switch 202 blocks the communication path between the MEC server 200 and the base station device 204 (Step S13). As a result, the base station device 204 stops provision of the first service. On the other hand, communication between the MEC server 201 and the base station device 204 is continued. Therefore, the base station device 204 can continue providing the second service. That is, the communication terminal 208 can continue receiving the second service via the base station device 204.

Here, the communication terminal 207 is assumed to be a communication terminal having received the first service via the base station device 204 prior to Step S13. However, since the communication path between the base station device 204 and the MEC server 200 is blocked, the communication terminal 207 is not provided with the first service via the base station device 204. In view of this, the control device 206 refers to information on the servers with which the base station devices 203 and 204 can communicate and position information of the communication terminal 207. Then, the control device 206 extracts the base station device that can provide the first service to the communication terminal 207.

In the present example embodiment, the base station device 203 can communicate with the MEC server 200 that provides the first service. In addition, the number of times at which the MCS, being the second service, is provided by the base station device 203 is less than the predetermined counted value. Furthermore, the communication terminal 207 is located within the range of the coverage of cell 209 of the base station device 203. Therefore, the control device 206 determines that the base station device 203 can provide the first service to the communication terminal 207.

In this case, the control device 206 performs handover control whereby the communication terminal 207 is handed over to the base station device 203 from the base station device 204 (Step S14). That is, the control device 206 requests that the base station device 204 should hand over the communication terminal 207 from the base station device 204 to the base station device 203. Then, the base station device 204 hands over the communication terminal 207 from the base station device 204 to the base station device 203. Accordingly, the communication terminal 207 can receive the first service via the base station device 203. Note that information on which service the communication terminal 207 is receiving may be grasped by the control device 206 using a system that manages information on a subscriber and charging, such as a system of O&M, for example.

As described above, the present example embodiment can isolate the base station device 204 from the MEC server 200 detected to be abnormal. Therefore, the abnormality caused in the MEC server 200 can be prevented from damaging the base station device 204 that is providing the MCS, and provision of the MCS can be continued. Therefore, even when the communication terminal 207 receives an unauthorized access because of being a poorly secured terminal, the unauthorized access will be prevented from adversely affecting the MCS.

Furthermore, in the present example embodiment, such control is performed whereby the communication terminal having received the first service via the base station device 204 is handed over to the base station device 203. According to this control, the communication terminal 207 can continue receiving the first service. Here, the base station device 203 only provides the MCS the number of times less than the predetermined counted value. Therefore, if by any chance the abnormality caused in the MEC server 200 affects the base station device 203, the abnormality is unlikely to adversely affect the MCS. In particular, the base station to which the base station device 203 does not provide any MCS will never affect an MCS.

Note that, in the present example embodiment, provision of the first service by the base station device 203 is assumed to be continued after an abnormality is detected in the MEC server 200. However, the present invention is not limited to this arrangement. That is, it is also possible to stop the communication of the MEC server 200 and stop provision of the first service in all the base station devices, depending on the analysis result of the abnormality detected in the MEC server 200.

Further, in the present example embodiment, the control device 206 controls the handover of the communication terminal 207 from the base station device 204 to the base station device 203. However, the present invention is not limited to this arrangement. That is, it is also possible to arrange so that the base station device 203 and the base station device 204 performs handover control using an interface between base station devices, such as X2 in the long term evolution (LTE). In this case, the base station device 204 obtains identification information of the MEC server with which an adjacent base station device can communicate, information on the types of services provided by the adjacent base station device, and the like, from the adjacent base station device, via the interface between the base station devices. Then, the base station device 204 may determine to hand over the communication terminal 207 to the base station device 203, based on the obtained information.

In addition, in the present example embodiment, the MEC server is used as a server to provide the first service and the second service. However, the present invention is not limited to this arrangement. That is, any server that provides a service by communicating with the base station device via an interface such as an application programming interface (API) can be used.

In addition, in the present example embodiment, the priority level of a service is determined based on the required level of reliability. However, the present invention is not limited to this arrangement. That is, the priority level of a service may be determined based on another index such as a required level of real-time performance.

In addition, in the present example embodiment, the processing in Step S14 is performed after the processing in Step S13. However, the present invention is not limited to this arrangement. That is, the processing in Step S14 may be performed prior to the processing in Step S13.

In addition, in the present example embodiment, when the MEC server 201 that provides an MCS is detected to be abnormal, it is also possible to notify the system of O&M that the abnormality has been detected, instead of blocking the communication path between the MEC server 201 and the base station device 204.

[Third Example Embodiment]

Next, a third example embodiment of the present invention is described below. The communication system 30 according to the present example embodiment has a configuration similar to that of the communication system 20 according to the second example embodiment as illustrated in FIG. 3. The following describes a difference in operation of the communication system 30 according to the present example embodiment with respect to the communication system 20 according to the second example embodiment. The operation of the communication system 30 according to the present example embodiment is described below with reference to FIG. 5. Note that Steps S11 to S14 are similar to their counterparts in the second example embodiment.

Figure 5:
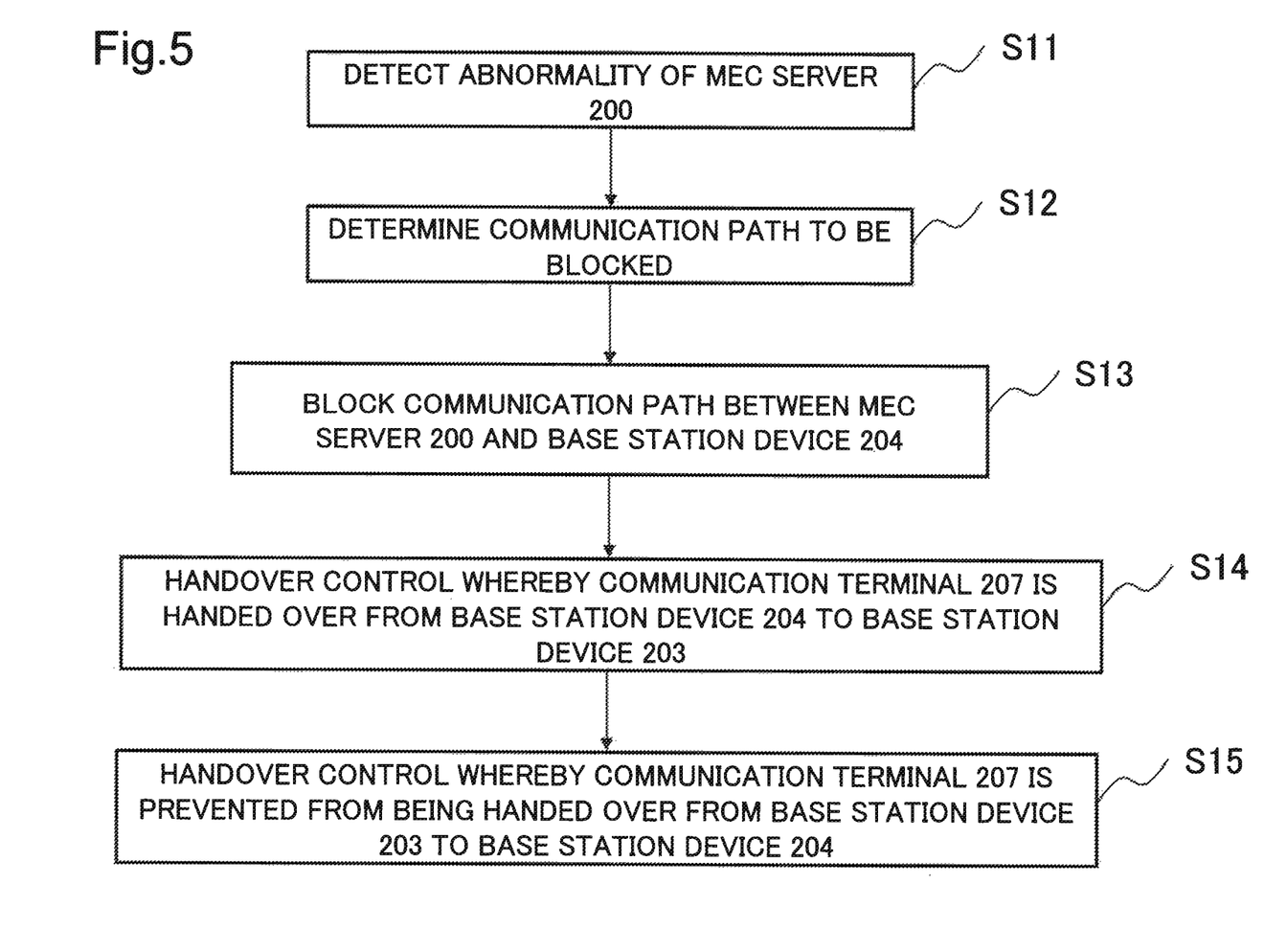
FIG. 5 is flowchart for explaining an operation of a communication system according to a third example embodiment.

Similarly to the second example embodiment, the communication system 30 according to the present example embodiment hands over the communication terminal 207 from the base station device 204 to the base station device 203, in Step S14. Here, when the communication terminal 207 stays in the coverage of cell 210 of the base station device 204, a so-called ping pong phenomenon likely occurs, in which the communication terminal 207 is handed over from the base station device 203 to the base station device 204 again.

In view of the above, the communication system according to the present example embodiment performs control to prevent the communication terminal 207 from being handed over from the base station device 203 to the base station device 204, after Step S14 (Step S15). That is, the control device 206 controls the communication terminal 207 not to be handed over to the base station device 204 again, after the communication terminal 207 is handed over from the base station device 204 to the base station device 203.

The following is a specific method to control the communication terminal 207 not to be handed over to the base station device 204. For example, the communication terminal 207 may be controlled not to transmit a measurement report concerning the cell of the base station device 204. Alternatively, it is also possible to remove the cell of the base station device 204, from a list of neighboring cells of the base station device 203, which is managed by either the control device 206 or the base station device 203. Alternatively, it is possible to post a flag indicating "NO HANDOVER" on the cell of the base station device 204, in the list of neighboring cells. Alternatively, it is possible to add information concerning services provided by each base station device, to the neighboring cell information of the base station device 203, the neighboring cell information being managed by either the control device 206 or the base station device 203. Then, deleting the first service from the provided service information corresponding to the cell of the base station device 204 may also be used for prevention of the handover of the communication terminal 207 to the base station device 204.

As described above, in the present example embodiment, after being handed over from the base station device 204 to the base station device 203, the communication terminal 207 is controlled not to be handed over to the base station device 204 again. With this, a ping pong phenomenon between the base station device 203 and the base station device 204 can be prevented. Here, the base station device 204 has stopped providing the first service, while the base station device 203 continues providing the first service. Therefore, by not being handed over to the base station device 204, the communication terminal 207 can continuously receive the first service.

[Fourth Example Embodiment]

Figure 6:
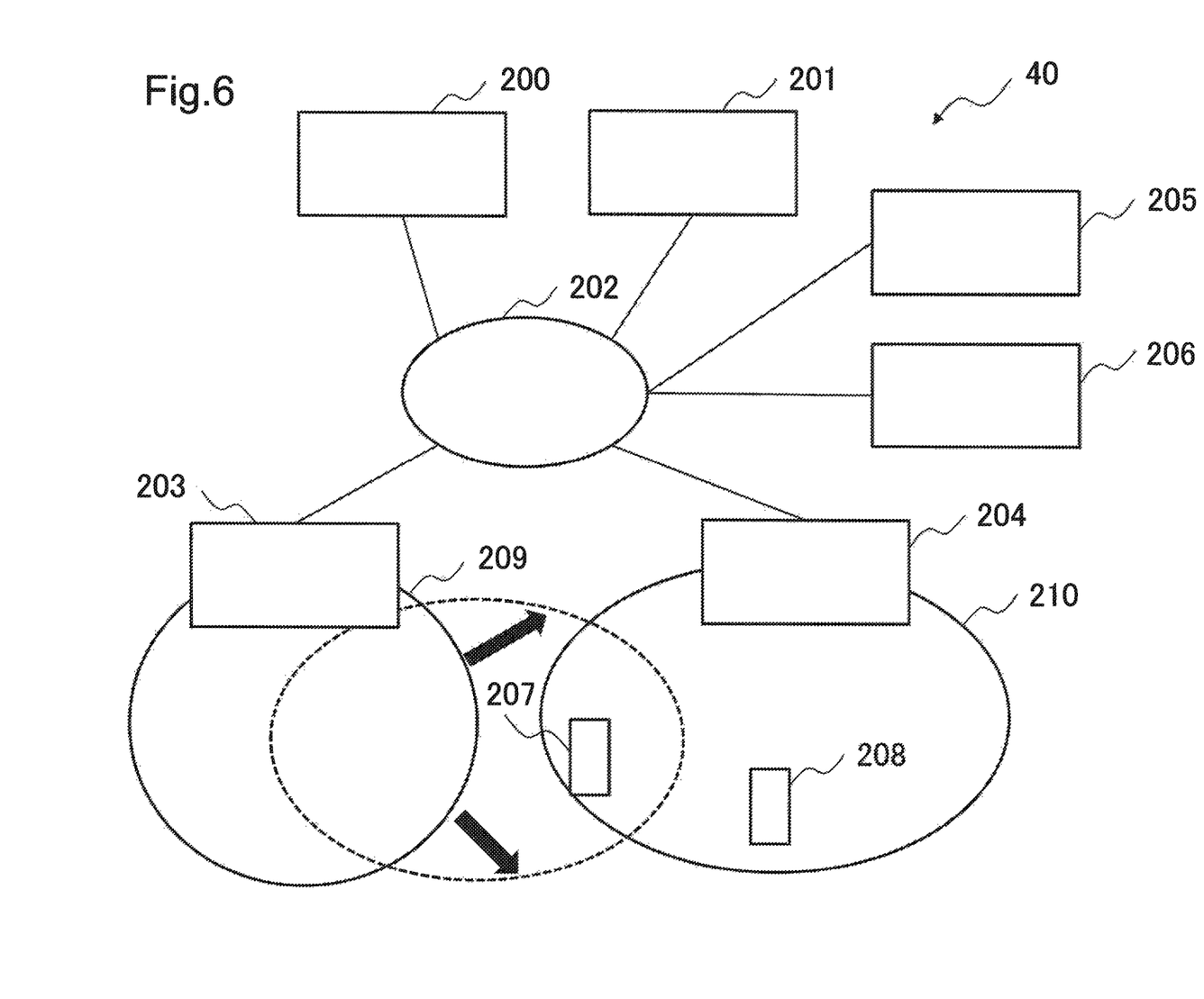
FIG. 6 is a block diagram illustrating a configuration of a communication system according to a fourth example embodiment.

Next, a fourth example embodiment of the present invention is described below. FIG. 6 illustrates a configuration of a communication system 40 according to the present example embodiment. The communication system 40 has a configuration similar to the configuration of the communication system 20 according to the second example embodiment; however, the communication system 40 is different from the communication system 20 in point of locations of the communication terminal 207. That is, in the second example embodiment, the communication terminal 207 is located in a position at which the coverage of cell 209 of the base station device 203 overlaps with the coverage of cell 210 of the base station device 204; whereas in the present example embodiment, the communication terminal 207 is located inside the coverage of cell 210 of the base station device 204 and outside the coverage of cell 209 of the base station device 203. In this case, the communication terminal 207 cannot perform handover from the base station device 204 to the base station device 203.

In view of this, it is assumed that the communication system 40 according to the present example embodiment changes the coverage of cell of the base station device 203. An operation of the communication system 40 according to the present example embodiment is described below with reference to FIG. 7. Note that, since being similar to their counterpart in the second example embodiment, the description of Steps S11 to S13 will be left out.

Figure 7:
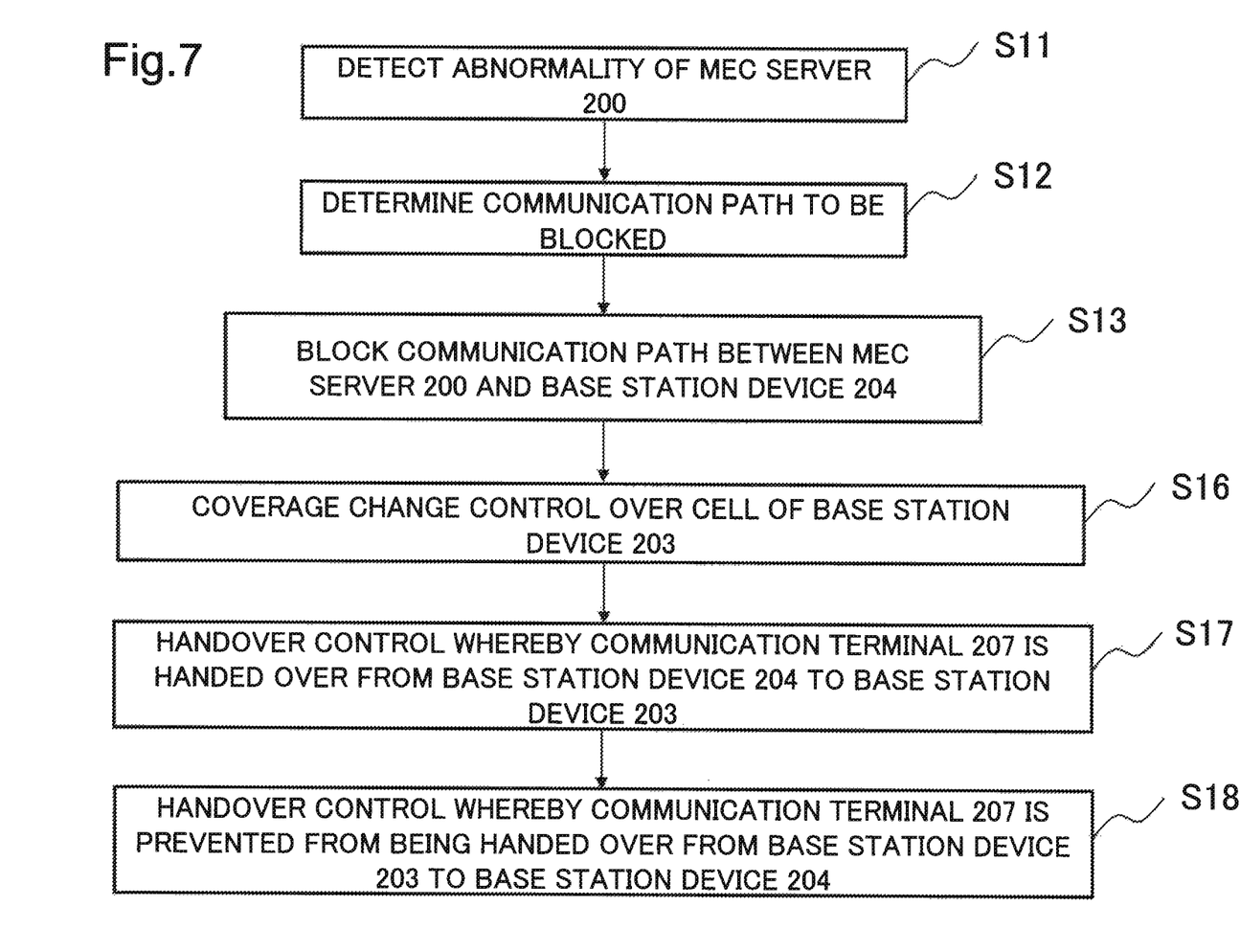
FIG. 7 is a flowchart for explaining an operation of the communication system according to the fourth example embodiment.

When the communication terminal 207 is not located inside the coverage of cell 209 of the base station device 203, and when the communication path between the MEC server 200 and the base station device 204 is blocked, the control device 206 performs coverage change control over the coverage of cell of the base station device 203 whereby the coverage of cell 209 of the base station device 203 covers the communication terminal 207 (Step S16). A specific method for the coverage change control is to change the transmission power, the antenna tilt, or the azimuth angle of a beam, into a direction where the communication terminal 207 is located. When there are a plurality of communication terminals unable to obtain the first service, besides the communication terminal 207, the positions of the plurality of communication terminals may be statistically processed, and the transmission power, the antenna tilt, or the azimuth angle of a beam may be changed into a direction where the communication terminals are concentrated the most. For the position of the communication terminal 207, information of a positioning function such as a global positioning system (GPS) incorporated in the terminal may be used. Alternatively, it is possible to estimate the position of the terminal and the azimuth angle of the terminal with respect to the base station device 203, using a method such as trilateration based on the intensity information of the radio wave received by the communication terminal 207 from the surrounding base station device and the positional information of the surrounding base station device.

Then, when the communication terminal 207 is located inside the coverage of cell 209 of the base station device 203 by changing the coverage of cell of the base station device 203, the control device 206 hands over the communication terminal 207 to the base station device 203 (Step S17).

Here, similarly to the third example embodiment, the control device 206 may control not to hand over the communication terminal 207 to the base station device 204 again (Step S18). In addition, the processing in Step S13 may be performed after the processing in Step S18.

On the other hand, cases may occur in which, even by changing the coverage of cell of the base station device 203, the communication terminal 207 cannot be included in the coverage of cell 209 of the base station device 203. In view of this, prior to executing Step S16, the control device 206 may extract the base station device that can provide the first service as well as can communicate with the communication terminal 207 by changing the coverage.

Figure 8:
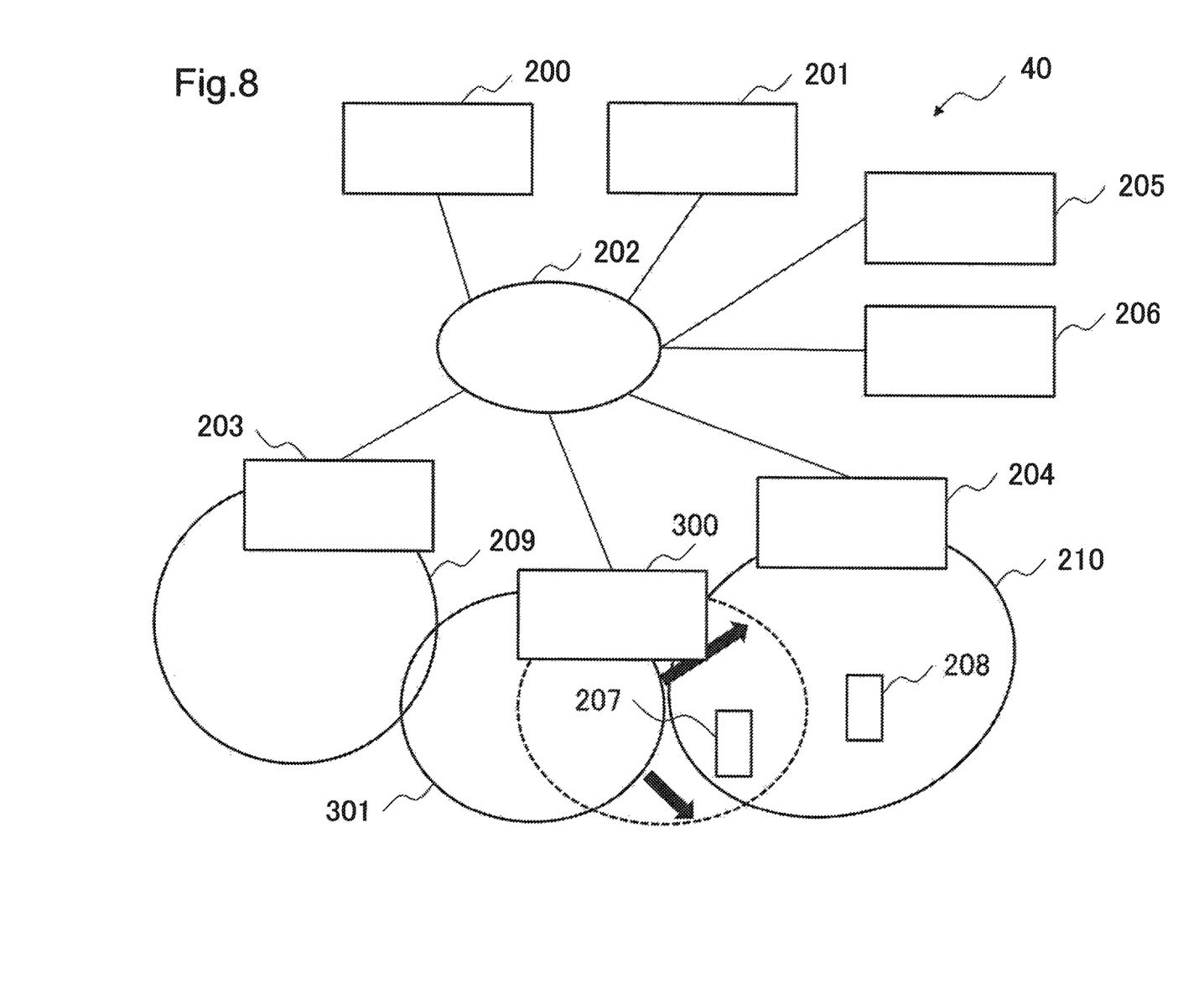
FIG. 8 is a block diagram illustrating another example of the configuration of the communication system according to the fourth example embodiment.

For example, as illustrated in FIG. 8, the communication system 40 according to the present example embodiment is assumed to further include a base station device 300 that can communicate with the MEC server 200. An operation of the communication system 40 in this case is described below with reference to FIG. 9. Since being similar to their counterpart in the second example embodiment, the description of Steps S11 to S13 will be left out. When the communication path between the base station device 204 and the MEC server 200 is blocked, the control device 206 selects a base station device over which coverage change control is to be performed, from among the base station devices 203 and 300 that can communicate with the MEC server 200 (Step S19). In the present example embodiment, the base station device 300 that is most adjacent to the communication terminal 207 is assumed to be selected. Then, the control device 206 controls to change the coverage of cell of the selected base station device 300 (Step S20). When the communication terminal 207 is located inside the coverage of cell 301 of the base station device 300 by changing the coverage of cell of the base station device 300, the control device 206 controls to hand over the communication terminal 207 from the base station device 204 to the base station device 300 (Step S21). Furthermore, the control device 206 may also control the communication terminal 207 not to be handed over to the base station device 204 again (Step S22). Note that the processing in Step S13 may be performed after the processing in Step S22.

Figure 9:
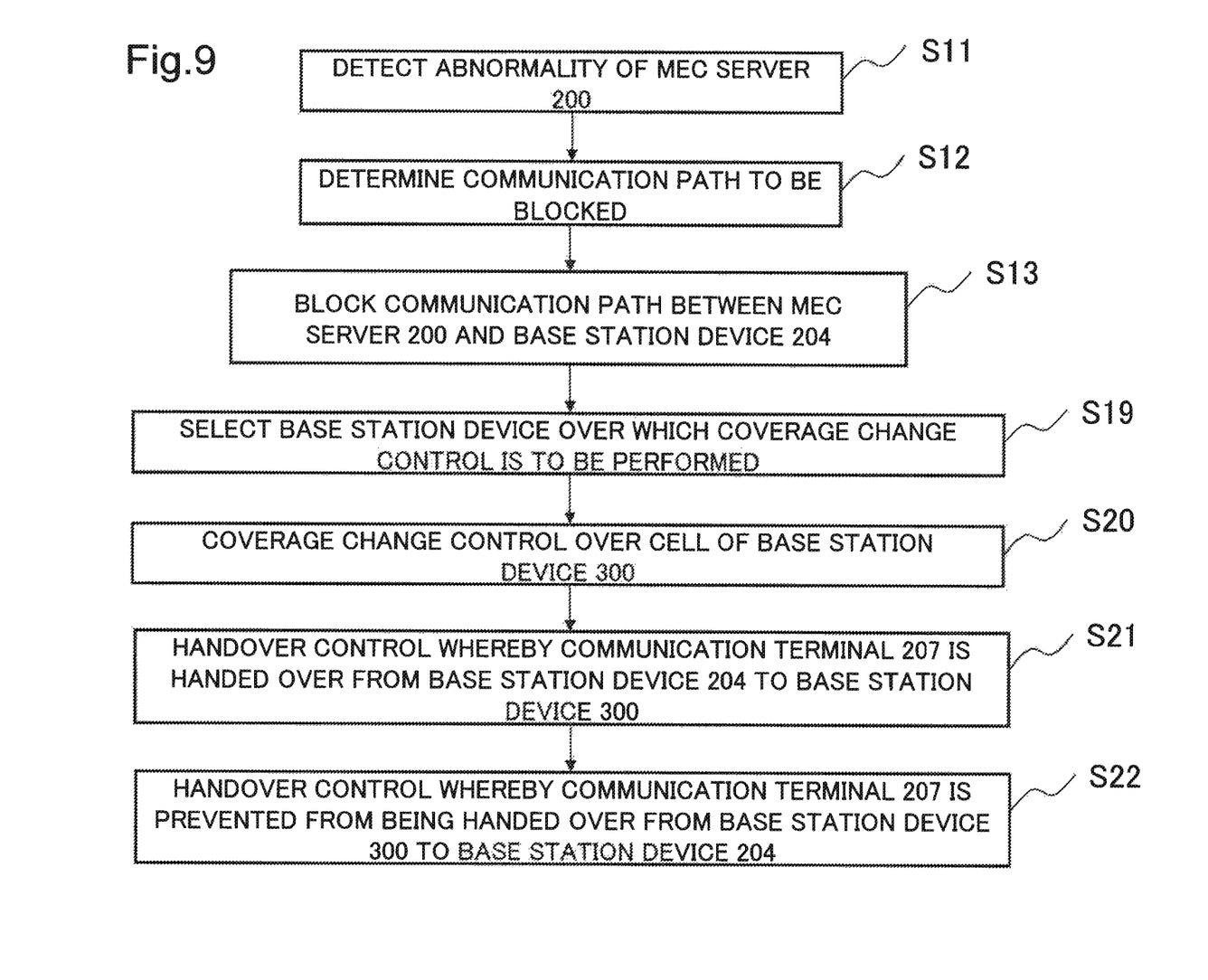
FIG. 9 is a flowchart for explaining another example of the operation of the communication system according to the fourth example embodiment.

As described above, in the present example embodiment, coverage change control is performed over the cell of the base station device whereby the communication terminal 207 enters the cell of the base station device that can provide the first service. With this, the communication terminal 207 can continue receiving the first service.

Each item of processing of the above-described example embodiment may be executed by software. That is, a computer program for performing each item of processing may be read in and executed by a CPU included in an information processing apparatus. Even when a program is used to perform each item of processing, the processing in content that is similar to the processing of the above-described example embodiment can be realized. The mentioned program may be stored in a non-transitory medium such as a semiconductor storage device such as a read only memory (ROM), a random access memory (RAM), and a flash memory, an optical disk, a magnetic disk, and a magnetooptical disk.

The whole or part of the example embodiments disclosed above can be described as, but not limited to, the following supplementary notes.

(Supplementary Note 1)

A communication system comprising:
a first server that provides a first service;
a second server that provides a second service; and
a first base station device that communicates with the first server and the second server, wherein when the second service has a higher priority level than the first service, and when an abnormality is detected in the first server, a communication path between the first base station device and the first server is blocked.

(Supplementary Note 2)

The communication system according to Supplementary Note 1, comprising:

a switch that performs switching between the communication path between the first base station device and the first server and a communication path between the second server and the first base station device, wherein when the abnormality is detected, the switch blocks the communication path between the first base station device and the first server.

(Supplementary Note 3)

The communication system according to Supplementary Note 2, further comprising:

a control device that controls the switching by the switch.

(Supplementary Note 4)

The communication system according to any one of Supplementary Notes 1 to 3, further comprising:

a monitoring device that detects an abnormality in the first server, wherein the monitoring device detects the abnormality based on an amount of traffic between the first server and the first base station device.

(Supplementary Note 5)

The communication system according to any one of Supplementary Notes 1 to 4, wherein the priority level is determined based on a level of reliability required for each service.

(Supplementary Note 6)

The communication system according to any one of Supplementary Notes 1 to 5, wherein the first base station device has a counted value for the number of times at which the first base station device has provided the second service to a communication terminal located inside a cell of the first base station device, the counted value being a predetermined value or more.

(Supplementary Note 7)

The communication system according to Supplementary Note 6, wherein the counted value is counted within a predetermined period of time.

(Supplementary Note 8)

The communication system according to any one of Supplementary Notes 1 to 7, further comprising:

a second base station device that communicates with the first server; and a communication terminal that subscribes to the first service, and receives the first service via the first base station device, wherein when the communication terminal is located inside coverage of a cell of the second base station device, and when the communication path between the first base station device and the first server is blocked, the communication system performs handover control whereby the communication terminal is handed over from the first base station device to the second base station device.

(Supplementary Note 9)

The communication system according to Supplementary Note 8, wherein the handover control further includes control whereby the communication terminal having been handed over is prevented from being handed over to the first base station device.

(Supplementary Note 10)

The communication system according to Supplementary Note 8 or 9 further comprising:

a control device that manages information on a type of a server with which each of the first base station device and the second base station device can communicate, wherein the control device performs the handover control over the first base station device based on the information.

(Supplementary Note 11)

The communication system according to Supplementary Note 8 or 9, wherein the first base station device, via an X2 interface, obtains information on a type of a server with which the second base station device can communicate, and the first base station device performs the handover control based on the information.

(Supplementary Note 12)

The communication system according to any one of Supplementary Notes 8 to 11, wherein when the communication terminal is not located inside the coverage of the cell of the second base station device, and when the communication path between the first base station device and the first server is blocked, the communication system performs coverage change control over the cell of the second base station device.

(Supplementary Note 13)

The communication system according to any one of Supplementary Notes 1 to 12, wherein the first server and the second server provide a service while communicating with the first base station device or the second base station device via an application programming interface (API).

(Supplementary Note 14)

The communication system according to any one of Supplementary Notes 1 to 13, wherein communication of the first server is stopped depending on an analysis result of the abnormality detected in the first server.

(Supplementary Note 15)

A base station device in a communication system, comprising:

a means that communicates with a first server that provides a first service;

a means that communicates with a second server that provides a second service; and a means that stops communication with the first server, when an abnormality is detected in the first server in cases where the second service has a higher priority level than the first service.

(Supplementary Note 16)

The base station device according to Supplementary Note 15, wherein the priority level is determined based on a level of reliability required for each service.

(Supplementary Note 17)

The base station device according to Supplementary Note 15 or 16, wherein the base station device has a counted value for the number of times at which the base station device has provided the second service to a communication terminal located inside a cell of the base station device, the counted value being a predetermined value or more.

(Supplementary Note 18)

The base station device according to Supplementary Note 17, wherein the counted value is counted within a predetermined period of time.

(Supplementary Note 19)

The base station device according to any one of Supplementary Notes 15 to 18, wherein when a communication terminal that receives the first service via the base station device is located inside coverage of a cell of another base station device that communicates with the first server, and when a communication path between the first server and the base station device is blocked, the base station device performs handover control whereby the communication terminal is handed over from the base station device to the other base station device.

(Supplementary Note 20)

The base station device according to Supplementary Note 19, wherein the handover control includes control whereby the communication terminal having been handed over is prevented from being handed over from the other base station device to the base station device.

(Supplementary Note 21)

The base station device according to Supplementary Note 19or 20, wherein the base station device, via an X2 interface, obtains information on a type of a server with which the other base station device can communicate, and the base station device performs the handover control based on the information.

(Supplementary Note 22)

The base station device according to any one of Supplementary Notes 15 to 21, wherein the first server and the second server provide a service while communicating with the first base station device or the second base station device via an application programming interface (API).

(Supplementary Note 22)

A control device in a communication system, wherein the communication system includes:

a first server that provides a first service;

a second server that provides a second service; and a first base station device that communicates with the first server and the second server, and when the second service has a higher priority level than the first service, and when an abnormality is detected in the first server, the control device controls whereby a communication path between the first base station device and the first server is blocked.

(Supplementary Note 23)

The control device according to Supplementary Note 22, wherein the communication system includes a switch that performs switching between the communication path between the first base station device and the first server and a communication path between the second server and the first base station device, and the control device blocks the communication path by controlling the switching performed by the switch.

(Supplementary Note 24)

The control device according to Supplementary Note 22 or 23, wherein the priority level is determined based on a level of reliability required for each service.

(Supplementary Note 25)

The control device according to any one of Supplementary Notes 22 to 24, wherein the communication system further includes:

a second base station device that communicates with the first server; and a communication terminal that subscribes to the first service, and receives the first service via the first base station device, wherein when the communication terminal is located inside coverage of a cell of the second base station device, and when the communication path between the first server and the first base station device is blocked, the control device performs handover control whereby the communication terminal is handed over from the first base station device to the second base station device.

(Supplementary Note 26)

The control device according to Supplementary Note 25, wherein the handover control further includes control whereby the communication terminal having been handed over is prevented from being handed over to the first base station device.

(Supplementary Note 27)

The control device according to Supplementary Note 25 or 26, wherein the control device manages information on a type of a server with which each of the first base station device and the second base station device can communicate, and the control device performs the handover control over the first base station device based on the information.

(Supplementary Note 28)

The control device according to any one of Supplementary Notes 25 to 27, wherein when the communication terminal is not located inside the coverage of the cell of the second base station device, and when the communication path between the first server and the first base station device is blocked, the control device performs coverage change control over the cell of the second base station device.

(Supplementary Note 29)

The control device according to any one of Supplementary Notes 22 to 28, wherein the first server and the second server provide a service while communicating with the first base station device or the second base station device via an application programming interface (API).

(Supplementary Note 30)

The control device according to any one of Supplementary Notes 22 to 29, wherein communication of the first server is stopped depending on an analysis result of the abnormality detected in the first server.

(Supplementary Note 31)

A communication method in a communication system, wherein the communication system includes:

a first server that provides a first service;

a second server that provides a second service; and a first base station device that communicates with the first server and the second server, the communication method comprising:

blocking a communication path between the first base station device and the first server, when an abnormality is detected in the first server in cases where the second service has a higher priority level than the first service.

(Supplementary Note 32)

The communication method according to Supplementary Note 31, comprising:

detecting the abnormality based on an amount of traffic between the first server and the first base station device.

(Supplementary Note 33)

The communication method according to Supplementary Note 31 or 32, wherein the priority level is determined based on a level of reliability required for each service.

(Supplementary Note 34)

The communication method according to any one of Supplementary Notes 31 to 33, wherein the communication system further includes:

a second base station device that communicates with the first server; and a communication terminal that subscribes to the first service, and receives the first service via the first base station device, the communication method comprising:

performing handover control whereby the communication terminal is handed over from the first base station device to the second base station device, when the communication path between the first base station device and the first server in cases where the communication terminal is located inside coverage of a cell of the second base station device.

(Supplementary Note 35)

The communication method according to Supplementary Note 34, wherein the handover control further includes control whereby the communication terminal having been handed over is prevented from being handed over to the first base station device.

(Supplementary Note 36)

The communication method according to any one of Supplementary Notes 31 to 35, comprising:

performing coverage change control over a cell of the second base station device when the communication path between the first base station device and the first server is blocked in cases where the communication terminal is not located inside coverage of the cell of the second base station device.

(Supplementary Note 37)

The communication method according to any one of Supplementary Notes 31 to 36, wherein the first server and the second server provide a service while communicating with the first base station device or the second base station device via an application programming interface (API).

(Supplementary Note 38)

The communication method according to any one of Supplementary Notes 31 to 37, comprising:

stopping communication of the first server depending on an analysis result of the abnormality detected in the first server.

(Supplementary Note 39)

A program for use in a communication system, wherein the communication system includes:

a first server that provides a first service;

a second server that provides a second service; and a first base station device that communicates with the first server and the second server, the program causing a computer to execute:

blocking a communication path between the first base station device and the first server, when an abnormality is detected in the first server in cases where the second service has a higher priority level than the first service.

(Supplementary Note 40)

A computer-readable information storage medium storing therein the program according to Supplementary Note 39.

So far, the present invention has been described by way of the example embodiments. However, the technical scope of the present invention is not limited to the description of the above-described example embodiments. It is obvious to those skilled in the art that various modifications and improvements are possible to the above-described example embodiments. It is therefore needless to say that embodiments with such modifications and improvements are also included in the technical scope of the present invention. In addition, the numerical values, the names of the configurations, and the like used in the example embodiments described so far are merely exemplary, and can be appropriately changed.

This application is based upon and claims the benefit of priority from Japanese patent application No. 2015-162350, filed on Aug. 20, 2015, the disclosure of which is incorporated herein in its entirety by reference.

REFERENCE SIGNS LIST 10, 20, 40 communication system
100, 101 server
102, 203, 204, 300 base station device
200, 201 MEC server
202 switch
205 monitoring device
206 control device
207, 208 communication terminal
209, 210, 301 coverage of cell

What is claimed is:

1. A communication system comprising:

a first server that provides a first service;

a second server that provides a second service;

a first base station device that communicates with the first server and the second server;

a second base station device that communicates with the first server; and a communication terminal that subscribes to the first service, and receives the first service via the first base station device, wherein;

when the second service has a higher priority level than the first service, and when an abnormality is detected in the first server, a communication path between the first base station device and the first server is blocked;

when the communication terminal is located inside coverage of a cell of the second base station device, and when the communication path between the first base station device and the first server is blocked, the communication system performs handover control whereby the communication terminal is handed over from the first base station device to the second base station device; and when the communication terminal is not located inside the coverage of the cell of the second base station device, and when the communication path between the first base station device and the first server is blocked, the communication system performs coverage change control over the cell of the second base station device.

2. The communication system according to claim 1, wherein the priority level is determined based on a level of reliability required for each service.

3. The communication system according to claim 1, wherein the first base station device has a counted value for the number of times at which the first base station device has provided the second service to a communication terminal located inside a cell of the first base station device, the counted value being a predetermined value or more.

4. The communication system according to claim 1, wherein
the handover control further includes control whereby the communication terminal having been handed over is prevented from being handed over to the first base station device.

5. The communication system according to claim 1, wherein
the first server and the second server provide a service while communicating with the first base station device via an application programming interface (API).

6. A control device in a communication system, wherein
the communication system includes:
a first server that provides a first service;
a second server that provides a second service;
a first base station device that communicates with the first server and the second server
a second base station device that communicates with the first server; and
a communication terminal that subscribes to the first service, and receives the first service via the first base station device, wherein:
when the second service has a higher priority level than the first service, and when an abnormality is detected in the first server, the control device controls whereby a communication path between the first base station device and the first server is blocked;
when the communication terminal is located inside coverage of a cell of the second base station device, and when the communication path between the first base station device and the first server is blocked, the control device controls whereby the communication system performs handover control whereby the communication terminal is handed over from the first base station device to the second base station device; and
when the communication terminal is not located inside the coverage of the cell of the second base station device, and when the communication path between the first base station device and the first server is blocked, the control device controls whereby the communication system performs coverage change control over the cell of the second base station device.

* * * * *